N. PETERSON.
TRACTOR WHEEL.
APPLICATION FILED OCT. 17, 1919.
1,353,068.
Patented Sept. 14, 1920.
2 SHEETS—SHEET 1.
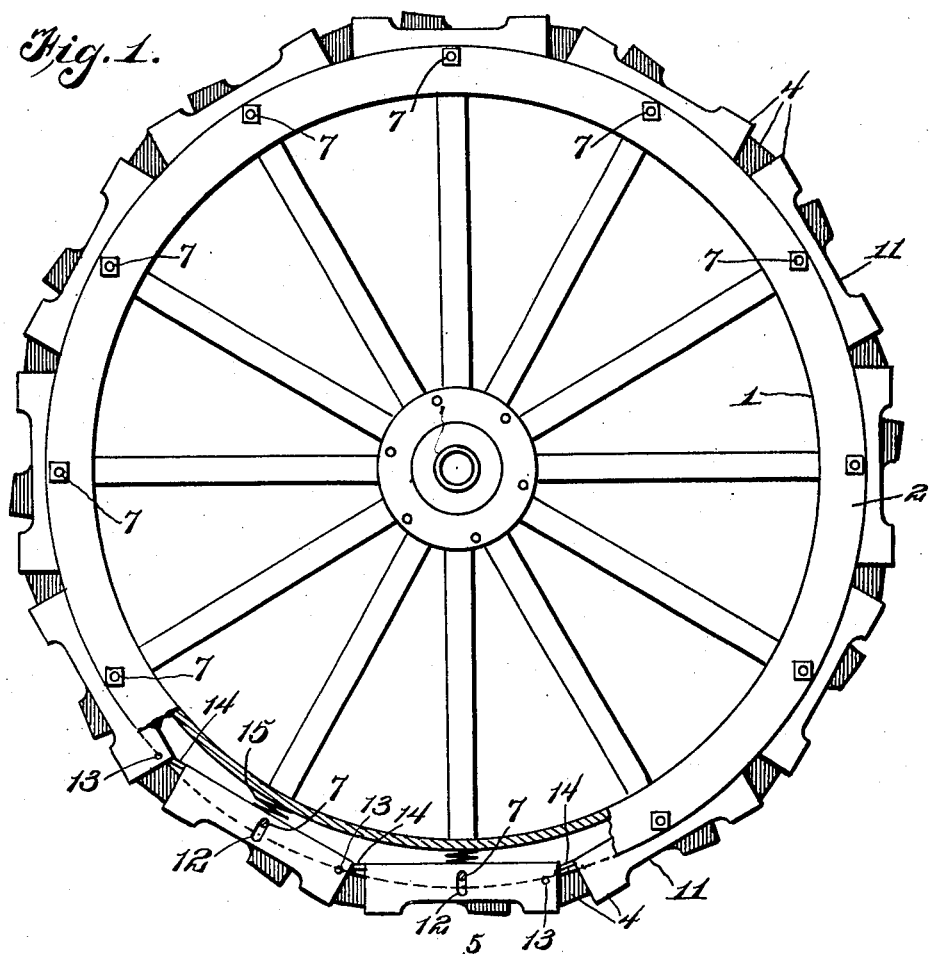
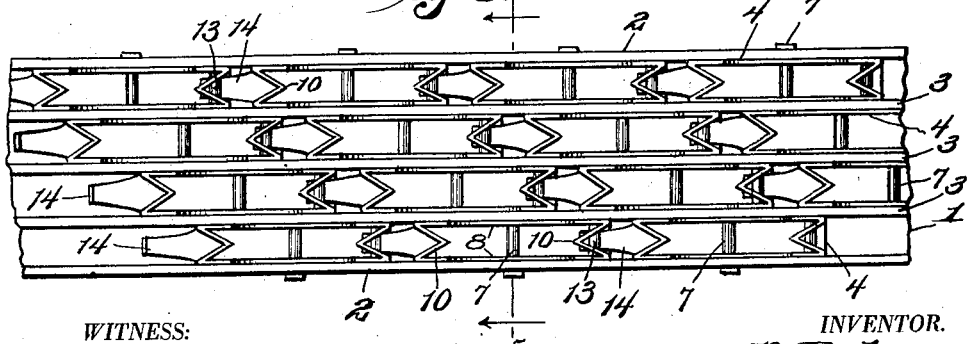
WITNESS:
L. R. Heinrichs
INVENTOR.
BY N. Peterson
Victor J. Evans
ATTORNEY.

N. PETERSON.
TRACTOR WHEEL.
APPLICATION FILED OCT. 17, 1919.
1,353,068.
Patented Sept. 14, 1920.
2 SHEETS—SHEET 2.
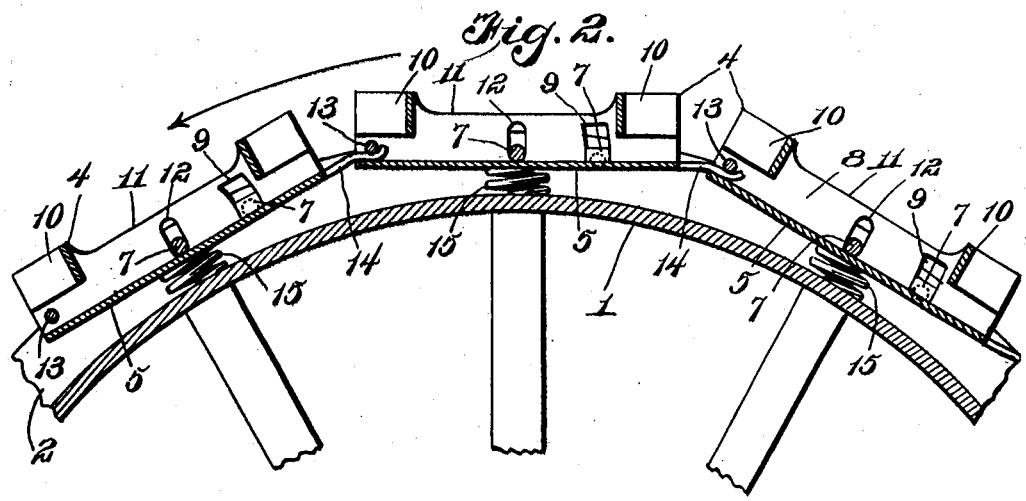
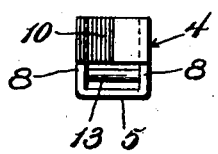
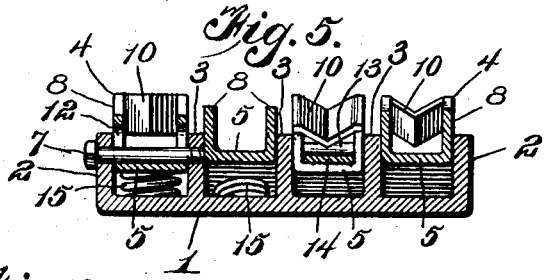
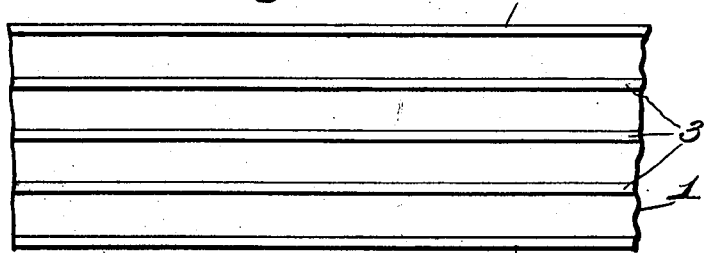
WITNESS:
L. R. Heinrichs
INVENTOR.
BY N. Peterson
Victor J. Evans
ATTORNEY.

UNITED STATES PATENT OFFICE.

NIELS PETERSON, OF ST. ANTHONY, IDAHO.

TRACTOR-WHEEL.

1,353,068.  Specification of Letters Patent.  Patented Sept. 14, 1920.

Application filed October 17, 1919. Serial No. 331,353.

*To all whom it may concern:*

Be it known that I, NIELS PETERSON, a citizen of the United States, residing at St. Anthony, in the county of Fremont and State of Idaho, have invented new and useful Improvements in Tractor-Wheels, of which the following is a specification.

The object of my present sole invention is the provision of a tractor wheel possessed of considerable tractive capacity and adapted to absorb shocks and strains due to bad roads, and to prevent the transmission of the same to the vehicle equipped with the wheel.

To the attainment of the foregoing the invention consists in the peculiar and advantageous tractor wheel hereinafter described and definitely claimed.

In the accompanying drawings, hereby made a part hereof:

Figure 1 is a side elevation of the tractor wheel constituting the best practical embodiment of my invention of which I am cognizant, with a portion of the rim flange broken away to show the relative arrangement of the ground-engaging or tread members of the wheel.

Fig. 2 is a longitudinal vertical section taken through a plurality of alined tread members to show the relative arrangement thereof.

Fig. 3 is a view, in plan, of the perimeter of the wheel and showing the staggered relation of the tread members in the several parallel series.

Fig. 4 is an end elevation of one of the tread members.

Fig. 5 is a transverse section taken in the plane indicated by the line 5—5 of Fig. 3.

Fig. 6 is a detail plan view showing a portion of the rim of the wheel, with the tread members removed.

Fig. 7 is a perspective of one of the tread members. Similar numerals of reference designate corresponding parts in all of the views of the drawings.

The rim 1 of my novel wheel is provided with side peripheral flanges 2 and intermediate peripheral flanges 3.

In the spaces between the said flanges are arranged circular sets of tread members 4, the tread members in the several circular sets or series being arranged in staggered relation, as appears in Fig. 3, with a view to enabling the tread members of the several series to engage the ground or roadway incidental to rotation of the wheel in succession, and in that way contribute to the tractive capacity of the wheel. The several tread members 4 are identical in construction, and therefore a detailed description of one tread member 4 will suffice to impart a definite understanding of all. In other words, each of the tread members 4 comprises a body wall 5, recessed at 6 to clear the head of an adjacent connecting bolt 7, side walls 8 disposed at right angles to the body wall 5, and recessed at 9 when necessary to clear an adjacent bolt 7, and end walls 10 of V-shape in cross-section connected to and extending inwardly from the ends of the side walls 8. Manifestly the edges of the side walls 8 and end walls 10 are adapted to sink into the ground or roadway, and it will be noticed in this connection that the side walls are recessed at 11, so that the end portions of said side walls will be embedded in the ground or in a roadway to a greater extent than the intermediate portions of the side wall. This provision is advantageous because it lessens the liability of the members 4 becoming clogged with dirt, and also because it facilitates the removal of caked dirt from the members 4 when the same is necessary. Each member 4 is connected to the peripheral flanges between which it is arranged by means of one of the bolts 7; the said bolt 7 being arranged in slots 12 in the side walls 8 of the member, as shown, so as to permit of bodily movement of the member 4 between two of the peripheral flanges and toward and from the center of the wheel. It will further be observed that each of the members 4 is provided at its forward end with reference to the direction indicated by arrow in which the wheel is intended to be driven, with a cross-rod 13, and is provided at its rear end with a rearward extension or tongue 14 that is disposed at the inner side of the cross-rod 13 of the next tread member 4 of the series, toward the rear. By reason of the relative arrangement of the tread members 4 in each circular set or series, it will be observed that incidental to rotation of the wheel in the direction indicated by arrow in Fig. 1, each of the tread members 4 when it is in full engagement with the ground or with a roadway, will have the effect of raising the forward end of the next forward or preceding tread member in its series, thereby enabling the next forward or preceding tread member to engage the ground or roadway without materially impeding the rotation of the wheel. In this connection it will be understood that the tongue 14 on each tread brings about the results stated by thrusting upwardly against the forward end of the body wall 5 of the next preceding tread member.

Interposed between and retained between the rim 1 of the wheel and central portion of each of the tread members 4 is a coiled spring 15. By virtue of this provision the tread members 4 are cushioned, with the result that the wheel is adapted to absorb shocks and jars and prevent the transmission of strain to the vehicle equipped with the wheel.

The staggered arrangement of the tread members 4 of the several series is advantageous, because it assures one of the tread members being in full engagement with the ground at all times, with the result that the tractive capacity of the wheel is increased.

It will be apparent from the foregoing that my novel wheel is simple and inexpensive in construction, and yet is designed to occupy the field between that of the small tractor wheel and that of the track-laying tractor. It will also be apparent that in the use of my novel wheel, a considerable number of the tread members 4 will at all times be in engagement with the ground or roadway, with the result that ample traction is afforded for general purposes.

Having described my invention, what I claim and desire to secure by Letters-Patent, is:

1. In a tractor wheel, the combination of a rim having spaced and parallel peripheral flanges, bolts carried by said flanges and bridging said spaces, and tread members receiving and movable bodily on the bolts and having forwardly extending tongues, whereby each tread member as its forward end is forced upwardly by engagement with the ground is enabled to raise the rear end of the next forward tread member in its series, and a spring interposed between the central portion of each tread member and the rim, whereby the wheel is cushioned.

2. In a tractor wheel, the combination of a rim having spaced and parallel peripheral flanges, bolts carried by said flanges and bridging said spaces, and tread members receiving and movable bodily on the bolts and having forwardly extending tongues, whereby each tread member as its forward end is forced upwardly by engagement with the ground is enabled to raise the rear end of the next forward tread member in its series, and a spring interposed between the central portion of each tread member and the rim, whereby the wheel is cushioned; the tread members in the several series being arranged in staggered relation.

3. In a tractor wheel, the combination of a rim having peripheral spaced flanges, bolts bridging the space between the flanges, and a circular series of tread members movable bodily on the bolts between the flanges and each tread member having a forwardly extending tongue arranged to raise the rear end of the next forward or preceding tread member, the said tread members being backed by springs interposed between the same and the rim.

In testimony whereof I affix my signature.

NIELS PETERSON.